(12) United States Patent
Ciet et al.

(10) Patent No.: US 8,014,520 B2
(45) Date of Patent: Sep. 6, 2011

(54) EXPONENTIATION LADDER FOR CRYPTOGRAPHY

(75) Inventors: Mathieu Ciet, Paris (FR); Augustin J. Farrugia, Cupertino, CA (US); Gianpaolo Fasoli, Palo Alto, CA (US); Filip Paun, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 776 days.

(21) Appl. No.: 12/054,249

(22) Filed: Mar. 24, 2008

(65) Prior Publication Data

US 2009/0238360 A1    Sep. 24, 2009

(51) Int. Cl.
*H04L 9/28* (2006.01)
*G06F 7/483* (2006.01)
(52) U.S. Cl. .................. 380/29; 708/200; 708/606
(58) Field of Classification Search .......... 380/29; 708/606
See application file for complete search history.

(56) References Cited

U.S. PATENT DOCUMENTS

| | | | | |
|---|---|---|---|---|
| 5,091,975 A | * | 2/1992 | Berger et al. | 382/123 |
| 5,850,444 A | * | 12/1998 | Rune | 705/79 |
| 6,108,784 A | * | 8/2000 | Seidensticker et al. | 713/187 |
| 6,490,357 B1 | * | 12/2002 | Rose | 380/265 |

* cited by examiner

*Primary Examiner* — Matthew Smithers
(74) *Attorney, Agent, or Firm* — Morrison & Foerster LLP

(57) ABSTRACT

Method and apparatus for data security using exponentiation. This is suitable for public key cryptography authentication and other data security applications using a one-way function. A type of exponentiation is disclosed here where the bits of an exponent value expressed in binary form correspond to a course (path) in a given graph defining the one-way function. This uses an approach called here F sequences. Each value is in a ladder of a sequence of values, as defined from its predecessor values. This ladder satisfies certain algebraic identities and is readily calculated by a computer program or logic circuitry.

11 Claims, 2 Drawing Sheets

EXPONENTIATION LADDER FOR CRYPTOGRAPHY

FIELD OF THE INVENTION

This disclosure relates generally to data security and more specifically to one-way functions for use in cryptography.

BACKGROUND

Modern cryptography (which is generally computer enabled) relies heavily on the idea of one-way functions. This is especially true of public key/private key cryptography. Generally, one-way functions are mathematical functions which are relatively easy to compute but significantly harder to reverse. That is, given a particular input value, it is easy to compute the function of that input value. However, given the output value, it is very hard to compute the input value even though the function itself is known. In this context difficult or hard to compute means that the difference in computational time between computing the forward function (easy) versus the reverse function (hard) is many orders of magnitude. For instance, it might take a second for a computer to compute the forward function but take hundreds of years for the same computer to compute the reverse of the function. Note that even for public key cryptography the one-way functions are not the method of encryption per se but are used generally to support key security and provide authentication. Public key cryptography is based on the concept that there are two different keys. A public key is used to encrypt a message and a private key for decryption of the same encrypted message. It is computationally hard to deduce the private key from the public key. Anyone with the public key can encrypt a message but only the intended recipient with the private key can decrypt it. Hence this process is based on the above indicated one-way functions, where encryption is the easy direction, and decryption (without the private key) is the hard (reverse) direction.

It is well known that various types or classes of algorithms (functions) have different degrees of hardness or difficulty. Generally, so-called exponential functions are considered the most complex or hard to reverse compute. Hence these are considered best for protection of keys and other types of cryptographic secrets. Exponentiation means a value raised to a particular power. Modular exponentiation is also well known as a type of exponentiation performed over a modulus or base. It is known to be particularly useful in computer science including cryptography. Calculating a modular exponentiation refers to calculating the remainder when dividing a positive integer b raised to the $e^{th}$ power (the exponent) by a positive integer m called the modulus. For example, given base b equals 5 and exponent 3 and modulus 13, the solution c is the remainder of 5 to the 3rd power divided by 13, which equals the remainder of 125 divided by 13, which equals 8. Modular exponentiation problems of the type above are considered relatively easy to calculate based on the well known square and multiply algorithm. On the other hand reversing these, also known as computing the discrete logarithm, which means finding the exponent e given the values of b, c and m is considered to be difficult or hard. Hence this is typical example of a well known one-way function. Note that in "strong" cryptography the value of b is often at least 256 binary digits. Hence calculating for discrete logarithms is merely the hard (reverse) complement of modular exponentiation. There are three main groups whose discrete logarithms are of interest to cryptographers, generally. The first is the multiplicative group of prime fields also known as Galois fields. Second is a multiplicative group of finite fields of characteristic 2 which is a type of Galois field. The third is referred to as elliptic curve groups over finite fields. Since most public key algorithms are based on the problem of finding discrete logarithms, this area has been extensively studied. There are two types of "hard" problems in cryptography which are solving the discrete logarithm problem and extracting the eth root of a number.

Elliptic curve cryptographic systems are well known. Elliptic curves are a well known field in mathematics, generally, and have been adapted for public key cryptographic systems as indicated above. Elliptic curves provide a method of constructing elements and rules of combining the produced groups. These groups have properties suitable to construct cryptographic algorithms, but lack the properties that facilitate reversing them; that is, it is hard to break messages thereby encrypted. For instance, elliptic curves are generally not considered smooth on a mathematical sense. In other words, they cannot be easily expressed by a simple algorithm at any one point. Many well known public key algorithms are implemented in elliptic curves over finite fields as indicated above. The elliptic curve approach draws also on the well known mathematical field of graph theory. A graph is a network of lines connecting different points. If two graphs are identical except for the physical location of the points they are called isomorphic. For an extremely large graph, finding whether two graphs are indeed isomorphic is considered a difficult (hard) problem.

Hence in most public key cryptosystems, modular exponentiations are at the heart of the implementation. The exponent (the notion of exponent is extended to all the type of operation even elliptic curve scalar multiplication as mentioned above), is binary decomposed. If the bits (the exponent value being expressed in binary form) are treated from the most to the less significant, a square (power of 2) is calculated each time, and if the bit is one, a multiplication is done with the original message. This is referred to as the square-and-multiply algorithm. Other exponentiation algorithms are less to most significant bit, and square-and-multiply always, using precomputed values to speed up computation.

Note that these types of hard or one-way functions are also suitable for authentication as well as for public key/private key cryptography. In the typical authentication situation one entity transmits a password to the other entity. The receiving entity (host) performs a one-way function on the password. The receiving entity compares the result of the one-way function to one of a list of values that was previously stored. In other words, the host does not need to store a table of all valid passwords; it merely stores the result of the one-way function of the passwords. If a thief breaks into the host and recovers the stored list of the one-way functions of the passwords, this does not give the thief (hacker) any ability to authenticate himself since he still does not know any useful passwords and cannot compute them from the recovered list of one-way functions of the passwords. Public key cryptography is also applied to authentication. This is somewhat more complicated but uses the same concepts. Hence the exponentiation problem is important in the field of cryptography and generally in data security referred to here as "cryptographic processes".

SUMMARY

Various ways are known to compute an exponentiation as indicated above: from the most significant bit to the less, from the less to the most, with sliding windows, using the Montgomery ladder, and others. The Montgomery ladder or Montgomery method is an efficient way to perform modular calculations. It was initially and specifically developed for fast multiplication on elliptic curves. It is also suitable for use, for instance, for RSA encryption or signatures or key exchange purposes. It can also be used for fast prime number tests and factorization algorithms when applied on Montgomery curves with the ECM method.

However, this disclosure is directed to a different way of calculating exponentiations for a cryptographic process (including encryption, authentication, signatures, key derivation, prime number tests, and factorization) where the bits of an exponent (expressed in binary form) correspond to a course of a given graph, as described above. The present method calculates these bits as a set of sequences where at each step there is an input value composed of (or partitioned into) two elements (values) of equal length. Depending on whether the current bit of a binary selection value is a 0 or 1, different calculations are used. In one embodiment for the 0 bit value, each successive step computes the first element squared, concatenated with the second element squared less the first element squared. For the 1 bit value, the step computes the second element squared less the first element squared, concatenated with the second element squared.

This can be generalized, so that instead of squares one may use a higher order of exponents (3, 4, etc.) for the calculations. Moreover, the order of the addition and subtraction operators may be reversed in another embodiment as explained further below.

In addition to a method, this disclosure is directed to computer software which carries out the method and is stored in a computer readable medium such as a CD, disc drive, computer memory, etc. Coding such software would be routine in, e.g., the C computer language in light of this disclosure. Also contemplated is a suitable computer system or computing device or dedicated cryptographic device programmed or hardwired to carry out this method. Such a computer system in terms of its hardware is conventional, since typically, such calculations are carried on the software. However, it is also routine to design hardware (circuitry) which would carry out this method. Since the calculations are relatively simple, a hardware approach is suitable, as well known in the cryptographic field.

Coding the software or designing the circuitry (or a combination of both) would be routine in light of this disclosure since the individual steps are expressed here as mathematical functions easily expressed in computer code, such as in the C language or in standard logic circuitry.

In a typical situation, the present method would be carried out in a computer or computing or electronic device such as a consumer electronics device which has some requirement for data security such as cryptography or authentication. Typically software code embedded in such a device would be in compiled form rather than in a source code form as is standard in the field. Where authentication is an issue, typically the authentication is between a host device and a client device where the client device wants to authenticate itself to the host which is typically a server. The client device is more likely to be a user or consumer device. The authentication would proceed as outlined above for conventional authentication, but using the method disclosed here. As indicated above, this may be the straightforward authentication as described above or a public key/private key type authentication of the type well known in the field.

DETAILED DESCRIPTION

In this disclosure instead of considering a way to calculate an exponentiation as with the Montgomery ladder, a different type of exponentiation is disclosed, where the bits of an exponent value (expressed in binary form) correspond to a course (path) in a given graph. To do so, this disclosure introduces what is referred to here as F sequences and explains how these are is used to calculate exponentiation.

Let function F define the sequence of an exponentiation. Each of $F_{2n+1}$, $F_{2n}$ is expressed from predecessor values as follows where n is a positive integer:

$$F_{2n+1} = F^2_{n+1} - F^2_n$$

$$F_{2n} = F^2_n$$

In this notation, $F^2_n$ means $(F_n)^2$.

Thus the following identities are satisfied:

$$F^2_{n+1} = F_{2n+1} + F_{2n}$$

$$F^2_n = F_{2n}$$

$$F^2_n = F_{2n+2} - F_{2n+1}$$

An exponentiation can be calculated from this using the principle of a ladder. That is from values $F_n$ and $F_{n+1}$, one computes values $F_{2n}$ and $F_{2n+1}$, or $F_{2n+1}$ and $F_{2n+2}$ the calculation being according to whether the particular currently treated bit of a binary secret (secure) selection value has the value 0 or 1.

Note also the inverse of the above F sequence is another embodiment of the method since it consists of extracting a square root. This square root extraction problem is known to be hard as defined above (computationally expensive) if done over a well-suited group.

To use the present method, one defines the secret "exponent" value d. Value d defines the path in the graph. Given an input entry (initial value), one computes the equivalent of an exponentiation using this ladder method. The input value to the F sequence may be initialized as (l,m), where m is the data (message in cryptographic parlance) to expand. The operations are computed, e.g., as being a modulus of a given modulus base, as explained above.

Figure 1:
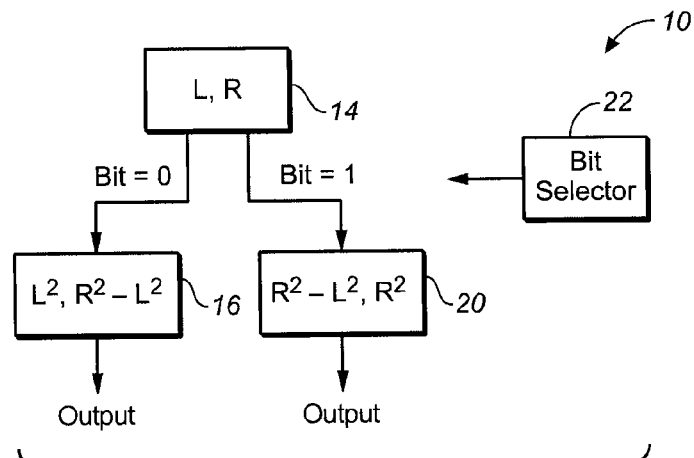
FIG. 1 is a diagram of a step of a generalization of the present ladder approach.

FIG. 1 shows a generalized process 10 for one step of the present type of exponentiation (F sequence) calculation. In the first box 14 are provided two values referred to as L, R (for left and right). In one embodiment these are each numerical binary values, each being 16 bytes in length, 1 byte typically equaling 8 bits. Hence the concatenated L,R values are 32 bytes total which together are the input data to the F sequence. Hence in this particular embodiment, typically there is a 32 byte long input L,R and a 32 byte long output from process. 32 bytes are a typical length for computational security and modern commercial applications. Of course, the length could be greater, for instance, 128 bytes total for the L and R values, each being 64 bytes long. Moreover note that the use of squares (the second power) here in boxes 16,20 is merely illustrative as explained above; in more complex embodiments this may be a third, fourth or $n^{th}$ power (order) or may be square or other roots. Of course, such calculations will be significantly more complex and hence slower, but not beyond the reach of modern computational devices, such as microprocessors.

In any case, as shown, the value d (expressed as a binary number) is subject to a bit selector 22, bit by bit. Starting with, e.g., the rightmost (least significant) bit for value d, the bit selector determines if that bit is a 0 or 1. If it is a 0 the left hand calculation 16 is applied in which the output value is equal to the concatenated value $L^2$, $R^2-L^2$ also expressed as $L^2\|(R^2-L^2)$ where "||" is the concatenation operator. Again, this is a 32 byte value, the result of the $L^2$ calculation being 16 bytes long, and the result of calculation $R^2-L^2$ also being 16 bytes.

If, however, the current bit of value d is a 1 instead, the right hand calculation 20 is provided whereby the output value is the concatenated values $R^2-L^2$, $R^2$ also expressed as $R^2-L^2\|R^2$. Again, this output is a 32 byte value.

Hence FIG. 1 is a generalization of an exemplary calculation used here in a ladder to calculate the F sequence. Again, the use of squares as shown in boxes 16, 20 in FIG. 1 is not limiting.

Figure 2:
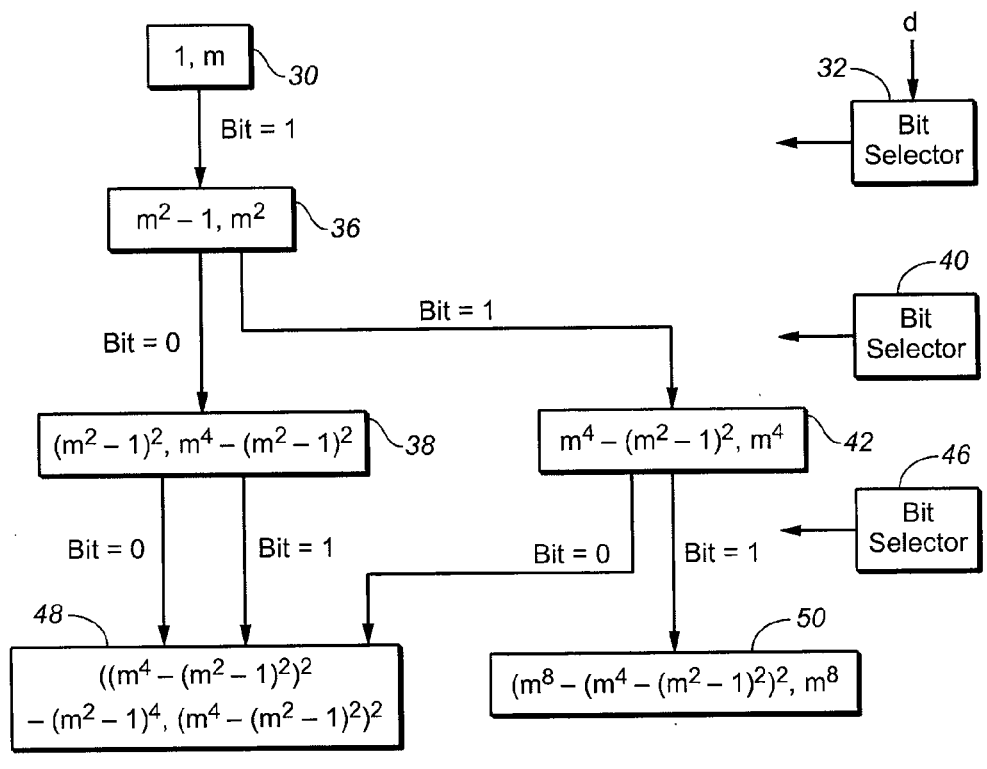
FIG. 2 is a diagram of a more specific implementation of FIG. 1.

FIG. 2 shows application of the FIG. 1 function to calculate an F sequence of values, hence the ladder. In FIG. 2 one starts with, as actual left and right values L,R at 30, the values l,m, where m is the message being encrypted or authenticated. Of course, rather than a true message, m may be a key value or password or signature. Here at 30, the left value L is arbitrarily chosen as 1. This is not limiting. In the first calculation, the bit selector 32 is consulted and at this point the bit 1 selection is made due to the value of d. Hence the bit selector finding the relevant bit of d to be 1, the first step 36 calculates as in FIG. 1, $R^2-L^2$, $R^2$, which equals $m^2-1, m^2$. The bit selector at 40 is again invoked. For the bit value 0 here of d the left hand calculation 38 is used, which corresponds to $L^2-R^2$, $L^2$, here expressed in terms of m and 1. For a bit value of d equal to 1, the right hand calculation 42 is chosen corresponding to, in FIG. 1, $R^2-L^2$, $R^2$. This results in the expressions and calculations shown in FIG. 2 at 38, 42.

Then at the next step of the ladder, one again applies the bit selector at 46. In this case, only the expressions for a bit of d equal to 1 are shown for simplicity of illustration at 48, 50. With reference to FIG. 2, if d=101 then one gets the value in box 48. If d=111, then one gets the value in box 50. (The expressions for a bit value of d equal to 0 are omitted, however, this would follow the procedure shown in FIG. 1.) As can be seen rapidly the calculations include very high values of exponents. As can be appreciated, this results in very large numbers, however these are at each step shortened so only, for instance, 32 bytes are passed to the next step. The higher order bits are thereby typically eliminated via a modular reduction, either by a modulus or a prime number factoring.

As can be seen this ladder consists of a set of similar calculations with bit selection. Hence implementation is relatively easy in a computer program or hardware (logic) and the calculations may be performed relatively quickly.

In addition to the possibility of using exponents other than 2, for instance, 3, 4, 5, etc., another "reversed sign" embodiment uses a slightly different set of functions with the + and − operators shown in FIG. 1 inverted. Thereby, the positive operators become 1 and the negative operators become +. To express this another way, in this reversed sign embodiment each value $F_n$ is defined from its predecessor as follows:

$$F^2_{n+1}=F_{2n+1}+F_{2n}$$

$$F^2_n=F_{2n}$$

$$F^2_n=F_{2n+1}-F_{2n+2}$$

As can be seen, this is slightly different from the identities shown above because it involves changing the operators. The calculations shown in FIGS. 1 and 2 would be modified accordingly for this embodiment, but the changes are easily implemented in computer software or hardware. This reversed sign embodiment would have the same utility as the embodiment of FIG. 2.

Distinctions of the present approach over the Montgomery ladder include the absence of invariants which are used in the Montgomery ladder and not requiring computation of an exponentiation. It is believed that the one-way function disclosed here is at least as difficult to reverse calculate as discrete logarithms or square roots or integer factorization, hence the present method is suitable for data security and cryptography.

The present method has several advantages including the use of all the intermediate values of the sequence $F_n$ thereby avoiding being subject to a fault attack, not having highly linear execution, and avoiding other potential flaws such as being subject to a simple side-channel analysis. The present method can be used as definition of a road (path) inside a graph. One use is for authentication using a random input as a challenge.

Figure 3:
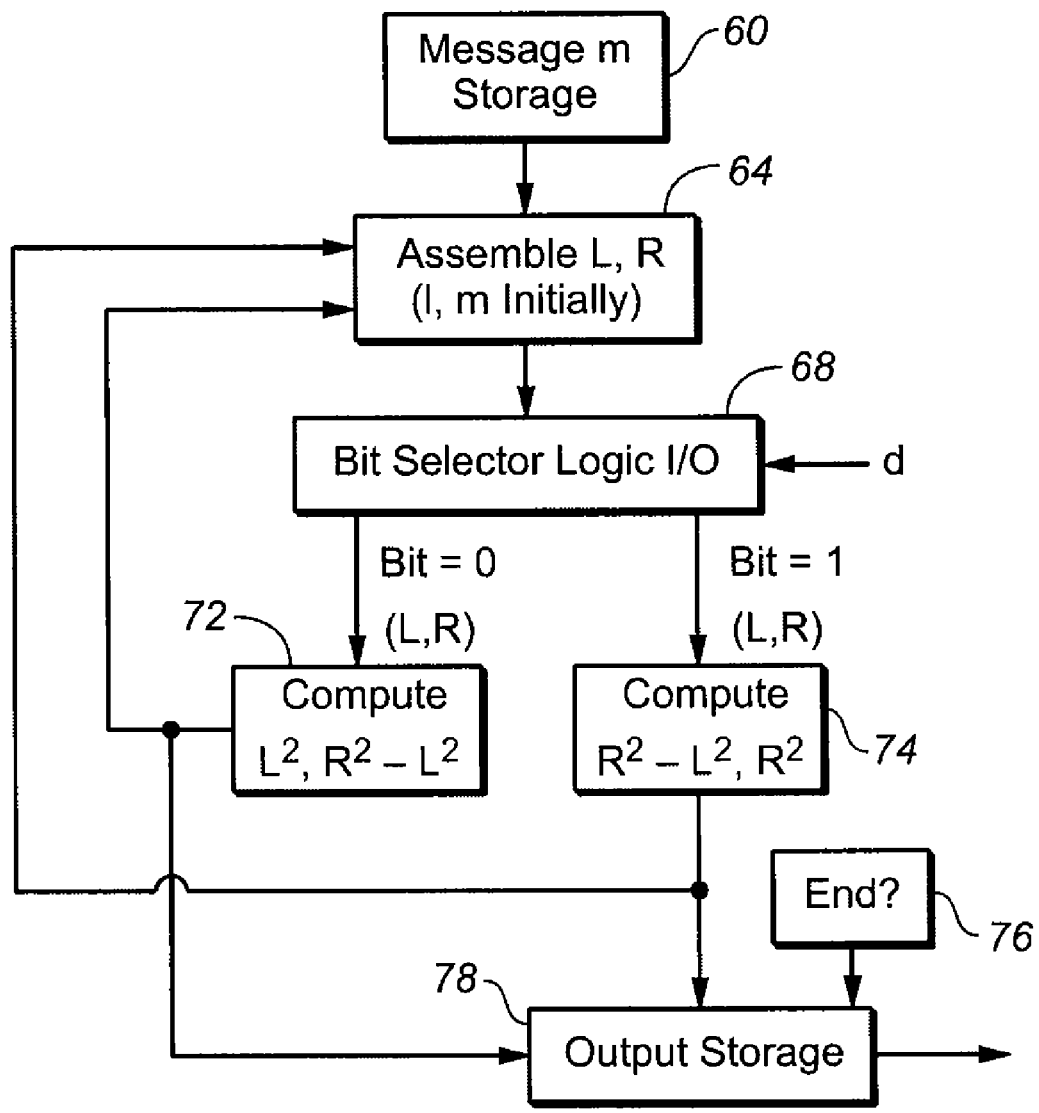
FIG. 3 is a block diagram of an apparatus for carrying out the FIG. 2 method.

FIG. 3 shows in a block diagram form the structure of a computer program (as embodied in a programmed computer) or logic circuitry for carrying out the method of FIG. 2. As shown, this involves a collection of linked storage elements such as registers or memory cells and calculation elements. In one version of this, the calculations are based on the use of the generalized form of the two functions shown in FIG. 1 as the calculator (computing) elements. In more detail, the initial input is the message m, held in storage element 60. This is assembled into the L,R values (initially corresponding to l,m) at assembly logic 64, linked to the 1/0 bit selector logic 68. Two computing/calculator elements 72, 74 receive L,R depending on the selected bit value, and perform the indicated calculations per FIG. 1. The outputs of elements 72, 74 are coupled back to the assembler 64 to generate the next L,R values. When sufficient exponentiation values are generated as determined by end test 76, they are stored in output storage 78 for use, e.g. as a cryptographic key.

This disclosure is illustrative but not limiting; further modifications will be apparent to those skilled in the art in light of this disclosure and are intended to fall within the scope of the appended claims.

What is claimed as new and desired to be protected by Letters Patent of the United States is:

1. A method of determining a cryptographic one-way function value, comprising the acts of:
   providing an initial value;
   calculating from the initial value a plurality of successive exponential function output values $F_n$, n representing a sequence of integers and $F_{in}=(F_n)^i$, i being an integer greater than one, wherein a length of the output values is at least that of the initial value;
   storing the plurality of values $F_n$ in a storage element; and
   using the successive stored values in a cryptographic process.

2. The method of claim 1, wherein the cryptographic process is a key derivation, authentication, or signature.

3. The method of claim 1, where i=2, so $F_{2n}=(F_n)^2$ and wherein $$F_{2n+1}=(F_{n+1})^2-(F_n)^2 \text{ or } F_{2n+1}=(F_{n+1})^2+(F_n)^2.$$

4. The method of claim 1, wherein the calculating the plurality of values includes applying a bit selector to each previous calculated value.

5. The method of claim 4, wherein i=2 and the calculating a plurality of successive values calculates a square of a first part of the previous value and a difference between square of the first part and a second part of the previous value.

6. The method of claim 1, wherein the initial value includes data to be protected by the cryptographic process.

7. The method of claim 5, further comprising the acts of: providing a selection value, wherein the calculation is dependent on the selection value.

8. A non-transitory computer readable medium storing code for carrying out the method of claim 1.

9. A computing device programmed to carry out the method of claim 1.

10. A cryptographic device including circuitry for carrying out the method of claim 1.

11. A cryptographic system for providing a one-way function value, comprising:

a storage element for data to be protected;
an assembler coupled to the storage for assembling an initial value including the data to be protected;
a bit selector coupled to the assembler;
a calculator portion coupled to the bit selector and which calculates using the initial value a plurality of successive exponential function output values $F_n$, n representing a sequence of integers and $F_{in} = (F_i)^n$, i being an integer greater than 1, wherein a length of the output values is at least that of the initial value; and
a second storage element coupled to the calculator portion for storing output values of the calculator portion, the calculator portion also being coupled to the assembler.

\* \* \* \* \*